L. BUDDE.
HAY BED.
APPLICATION FILED FEB. 13, 1917.

1,275,840.

Patented Aug. 13, 1918.
3 SHEETS—SHEET 1.

Inventor
Lawrence Budde,
By Talbert & Parker
Attorneys

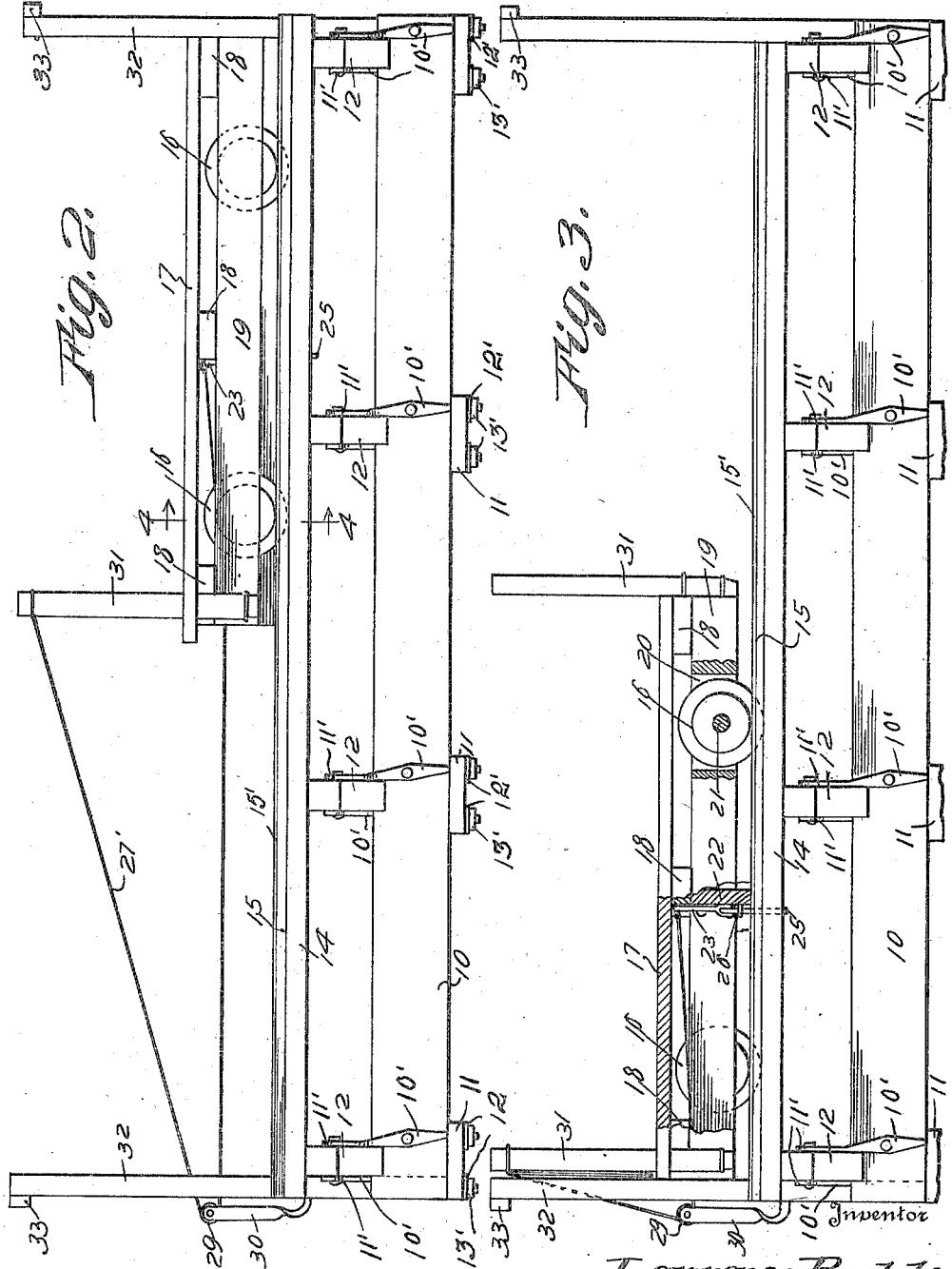

L. BUDDE.
HAY BED.
APPLICATION FILED FEB. 13, 1917.
1,275,840.
Patented Aug. 13, 1918.
3 SHEETS—SHEET 3.
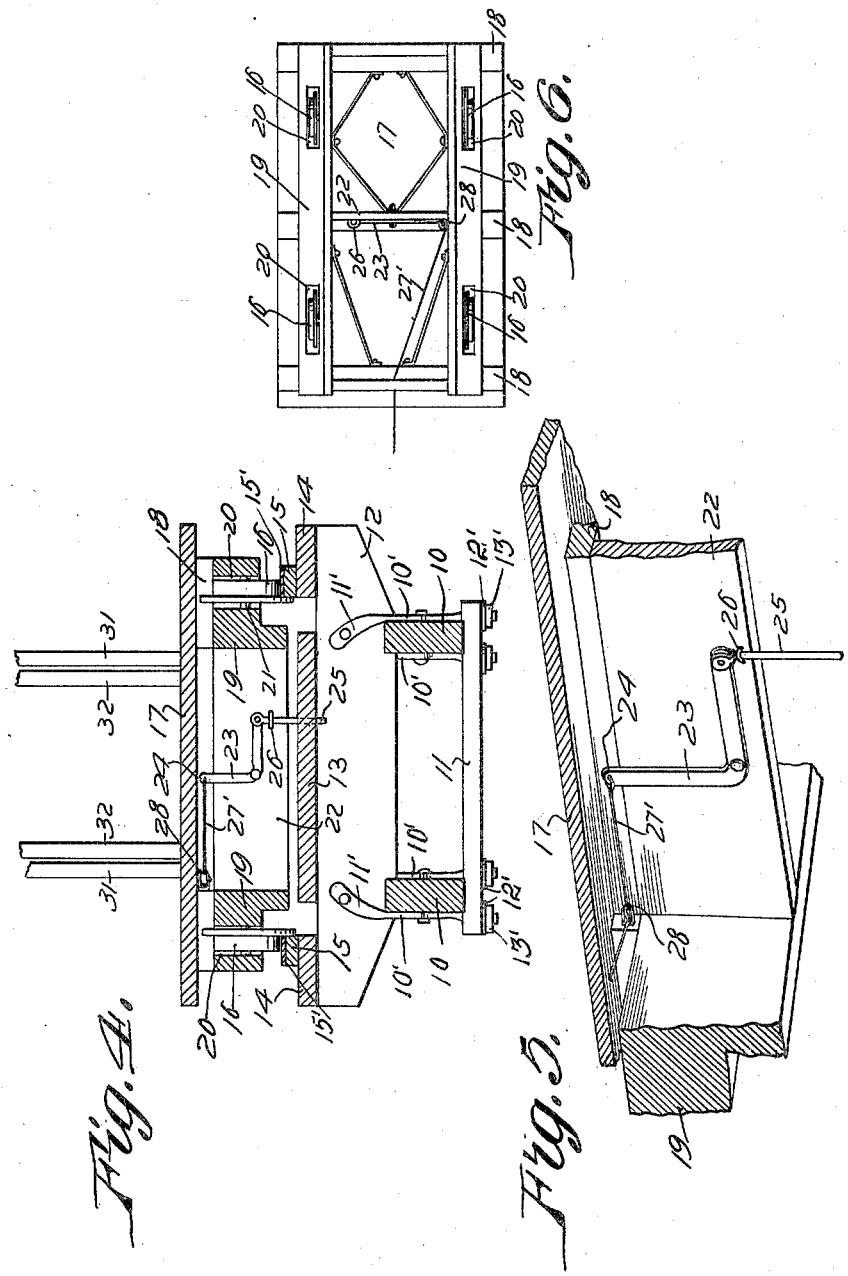

UNITED STATES PATENT OFFICE.

LAWRENCE BUDDE, OF CHICKASAW, OHIO.

HAY-BED.

1,275,840.　　　　　Specification of Letters Patent.　　Patented Aug. 13, 1918.

Application filed February 13, 1917. Serial No. 148,427.

*To all whom it may concern:*

Be it known that I, LAWRENCE BUDDE, a citizen of the United States, residing at Chickasaw, in the county of Mercer and State of Ohio, have invented certain useful Improvements in Hay-Beds, of which the following is a specification, reference being had therein to the accompanying drawing.

The present invention relates to a device for handling hay, and has for an object to provide a hay bed, for wagons or the like, adapted to be loaded from one end and being provided with means whereby the front and rear ends of the hay bed may be filled to capacity.

It is another object of the present invention to provide a hay bed with a longitudinally shiftable part adapted to be adjusted to the rear end of the device and filled, and subsequently shifted to the opposite end of the hay bed to permit of the filling of the latter at its rear end.

The invention further aims at the provision of an improved automatic latch or securing means for locking the shiftable part in its different adjusted positions to securely hold the part when so adjusted.

The above, and other objects and advantages of this invention, will be more clearly brought out in the following detailed description of the present preferred embodiment of the invention, the same being shown in the accompanying drawings, wherein;

Fig. 2 is a side elevation of the same.

Fig. 3 is a similar view showing the shiftable part moved into the forward end of the device, parts of the same being in section.

Fig. 4 is a transverse section taken on the line 4—4 of Fig. 2.

Fig. 5 is a detail enlarged view of the latch and the parts adjacent thereto.

Fig. 6 is a bottom plan view of the movable truck.

Figure 1:
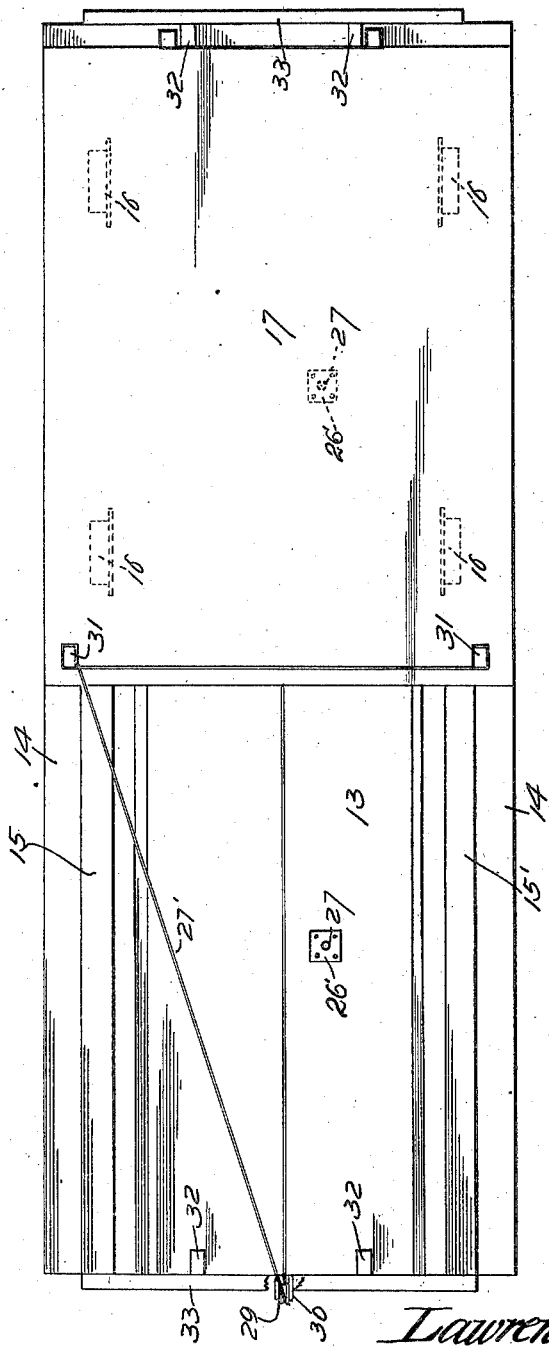
Figure 1 is a top plan view of a hay bed constructed according to the present invention, showing the shiftable part adjusted to the rear end thereof to receive a part of the load.

Referring to these drawings, wherein like parts are designated by similar numerals of reference throughout the several views, 10 designates a pair of longitudinal beams secured together at their lower edges by cross pieces 11 and joined together at their upper edges by bolsters 12. Bolts 10' are rigidly connected to the opposite sides of the beams 10 and have their angularly bent ends 11' rigidly connected upon opposite sides of the adjacent bolster 12 while the threaded ends are removably arranged in the cross piece 11, the projecting ends being engaged by washers 12' and nuts 13' engaged about the threaded extremities for effectively clamping these parts in a substantially rigid position. The bolsters 12 are provided with a longitudinal bottom 13 and with lateral strips 14 secured across the outer ends of the bolsters and preferably in spaced relation from the bottom 13. The lateral strips 14 are provided with rails 15 which extend longitudinally of the bed frame and have metallic strips 15' secured thereto upon which are supported flanged rollers or wheels 16 carried upon the shiftable part of the device.

The shiftable part of the device is in the form of a relatively low truck or platform having a flat top 17 reinforced by cross pieces 18 and supported upon sills or side pieces 19. These sills or side pieces 19 are made up of one or more longitudinally extending strips provided near their forward and rear ends with pockets or recesses 20 into which are fitted the rollers 16, the latter being mounted to turn on spindles 21. Intermediate the ends of the sills 19 is a transverse bar 22 upon which is pivoted a bell crank lever 23 provided with an eye 24 in one end and having a latch bolt 25 pivotally mounted upon its opposite end. The latch bolt 25 extends downwardly through an eye or guide 26 projecting from one side of the bar 22. The bolt 25 is of sufficient length to project down into one of the sockets or openings 27 formed in the upper face of the bottom 13 immediately beneath the bolt 25 to hold the shiftable part securely at the forward and read ends of the device. Plates 26' are attached to the bottom 13 and are provided with holes in registration with the sockets, so that the latter may be properly shielded at the top. A latch cord 27' is secured through the eye 24 and passes through a pulley block 28 secured to one of the side pieces 19 in transverse alinement with the lever 23, the latch cord 27' being carried forwardly from the shiftable part and passed over a roller 29 mounted in the upper end of an arm 30 which rises from the forward end of the bed frame. The latch cord 27' may be of any desired length and is preferably carried from the roller 29 back to one of the corner posts 31 which are socketed in the opposite corners and ends of the shiftable part. The bed frame is provided with upwardly extending poles 32 spaced apart at its opposite ends and reinforced by a pair of cross pieces 33.

In operation the latch cord 27' is drawn taut to swing the bell crank lever 23 and lift the latch bolt 25 out of the forward socket 27. The shiftable part is now moved to the rear end of the hay bed. When at said end the bolt 25 is permitted to drop by its weight into the adjacent socket 27 of the bottom 13 and thus lock the shiftable part in position. The rear end of the device is now loaded with hay, and the bolt 27 released and the shiftable part moved to the forward end of the device. The rear end of the bed frame is now filled with hay so that the device is filled at both ends practically to its full capacity.

The device is particularly adaptable for use where a hay loader is employed, and where it is practically inconvenient to shift the relation of the various devices by means of which the hay is handled. By providing a shiftable part the device may be operated by one man, as the rollers 19 considerably reduce friction between the shiftable part and the bed frame and permit of the relatively easy drawing of the shiftable part to the opposite ends of the frame.

It is of course understood that various changes and modifications may be made in the details of construction of the above specifically described embodiment without departing from the spirit of this invention, the changes and modifications being restricted only by the scope of the following claims.

Having thus described my invention, what I claim is:

1. In a device of the kind set forth, an elongated bed frame, a shiftable platform mounted upon the bed frame for movement to either end thereof, the elongated bed having sockets formed at specified points from either end, a locking member carried by the shiftable platform and adapted for engagement in either of the sockets, a sheave pulley carried at one end of the elongated frame, and a cord in engagement with the locking member, trained over the pulley and carried to the shiftable platform, whereby the exertion of a pulling force upon the cord will release the latch member and move the shiftable platform toward that end of the bed frame on which the pulley is mounted.

2. In a device of the kind set forth, an elongated bed frame, a shiftable platform mounted upon the bed frame for movement to either end thereof, the elongated bed having sockets formed at specified points from either end, a bell crank lever mounted upon the shiftable platform below the bottom of the latter, a bolt having pivotal connection at one end with the bell crank lever, the other end being adapted for engagement in either of the said sockets, a pulley carried at the forward end of the elongated frame, and a cord having one end attached to the remaining end of the bell crank lever, the cord being trained over the pulley and carried back to the shiftable platform, whereby, when the shiftable platform is at the rear end of the elongated frame, a pulling force exerted on the cord will remove the bolt from the socket member and thereafter result in moving the shiftable platform to the front end of the elongated frame.

In testimony whereof I hereby affix my signature.

LAWRENCE BUDDE.

Copies of this patent may be obtained for five cents each, by addressing the "Commissioner of Patents, Washington, D. C."